(12) United States Patent
Gordon et al.

(10) Patent No.: US 11,016,117 B2
(45) Date of Patent: May 25, 2021

(54) AIR DATA PROBE REPLACEMENT DETERMINATION SYSTEM

(71) Applicant: Honeywell International Inc., Morris Plains, NJ (US)

(72) Inventors: Grant A. Gordon, Peoria, AZ (US); Merle L Sand, Scottsdale, AZ (US); Lloyd Bratlien, Glendale, AZ (US); Jason Garde, Anthem, AZ (US); John W Jacoby, Glendale, AZ (US)

(73) Assignee: Honeywell International Inc., Charlotte, NC (US)

( * ) Notice: Subject to any disclaimer, the term of this patent is extended or adjusted under 35 U.S.C. 154(b) by 249 days.

(21) Appl. No.: 16/118,905

(22) Filed: Aug. 31, 2018

(65) Prior Publication Data

US 2020/0072866 A1 Mar. 5, 2020

(51) Int. Cl.
*G01P 21/00* (2006.01)
*G01K 7/16* (2006.01)
*G01P 5/165* (2006.01)
*G01P 13/02* (2006.01)

(52) U.S. Cl.
CPC ............... *G01P 21/00* (2013.01); *G01K 7/16* (2013.01); *G01P 5/165* (2013.01); *G01P 13/025* (2013.01)

(58) Field of Classification Search
CPC ........ G01P 21/00; G01P 13/025; G01P 5/165; G01K 7/16; G01R 31/008
See application file for complete search history.

(56) References Cited

U.S. PATENT DOCUMENTS

| | | | |
|---|---|---|---|
| 5,464,965 A | 11/1995 | Mcgregor et al. |
| 6,336,083 B1 | 1/2002 | Lanham et al. |
| 6,414,282 B1 | 7/2002 | Ice et al. |
| 7,725,293 B2 | 5/2010 | Bonissone et al. |
| 8,478,479 B2 | 7/2013 | Ghelam |
| 8,868,313 B2 | 10/2014 | Asti |
| 9,523,594 B1 | 12/2016 | Gordon et al. |
| 9,617,010 B2 | 4/2017 | Conrad |
| 10,430,800 B2 | 10/2019 | Remboski et al. |
| 2018/0275184 A1 | 9/2018 | Essawy et al. |
| 2019/0225245 A1 | 7/2019 | Kulkarni et al. |

FOREIGN PATENT DOCUMENTS

| | | |
|---|---|---|
| EP | 3018057 A1 | 5/2016 |
| JP | 2012253222 A | 12/2012 |

OTHER PUBLICATIONS

European Patent Office, "Extended European Search Report from EP Application No. 19194494.1", from Foreign Counterpart to U.S. Appl. No. 16/118,905, dated Dec. 4, 2019, pp. 1-8, Published: EP.

(Continued)

*Primary Examiner* — David Z Huang
(74) *Attorney, Agent, or Firm* — Fogg & Powers LLC

(57) ABSTRACT

Method and systems of determining when to replace an air data probe are provided. The method includes measuring a temperature of a heating element of an air data probe; tracking an amount of time the heating element is within at least one temperature range; and providing an air data probe replacement indication when a replacement threshold is met that is at least in part based on reaching a cumulative amount of time the heating element has a measured temperature within the at least one temperature range.

19 Claims, 4 Drawing Sheets

(56) References Cited

OTHER PUBLICATIONS

Parker, "What is an oil life indicator?", HowStuffWorks, pp. 1-9, https://auto.howstuffworks.com/under-the-hood/car-part-longevity/oil-life-indicator.htm.
European Patent Office, "Communication pursuant to Article 94(3) EPC from EP Application No. 19194494.1", from Foreign Counterpart to U.S. Appl. No. 16/118,905, dated Feb. 23, 2021, p. 1 through 6, Published: EP.

AIR DATA PROBE REPLACEMENT DETERMINATION SYSTEM

BACKGROUND

The health and integrity of aircraft air data sensors play a critical role in safely and effectively flying and controlling an aircraft. Pitot Probes are used to measure the airspeed of an aircraft and Pitot Static probes are used to measure both the plane's altitude and air speed. Inaccurate or false readings from these sensors/instruments can lead to inappropriate flight control which can have fatal consequences. Hence operational air data probes are part of the minimum equipment list required for flight.

Unanticipated probe failures can lead to aircraft on ground, flight delays and cancelations events that can be very expensive to an air carrier. Aggravating the problem of probe failures that result in unscheduled maintenance, is the fact that the availability of air data probes can be limited. If the air carrier does not carry inventory, or if the inventory is centrally located the lead times and replacement times can be significant. Thus air data probe customers value reliability over almost all other air data probe attributes.

The aversion to unscheduled maintenance is so strong that many operators pre-emptively replace pitot and other air data probes before they shows signs of aging. For example, one major airline replaces their probes very early in the expected life cycle (after every 18,000 hrs.) to avoid unscheduled removals.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. Embodiments provide a method of determining when to replace an air data probe based on an expected life of the air data probe.

In one embodiment, a method of determining when to replace an air data probe is provided. The method includes measuring a temperature of a heating element of an air data probe; tracking an amount of time the heating element is within at least one temperature range; and providing an air data probe replacement indication when a replacement threshold is met that is at least in part based on reaching a cumulative amount of time the heating element has a measured temperature within the at least one temperature range.

In another embodiment, another method of determining when to replace an air data probe is provided. The method includes measuring a temperature of at least one heating element of the air data probe; tracking time when the at least one heating element has a measured temperature within defined temperature ranges; applying a cumulated weighted system that predicts the life expectancy of the air data probe based on the tracked time of the at least one heating element within each temperature range; and generating a remaining life expectancy signal of the air data probe based on the prediction of the cumulated weighted system.

In still another embodiment, an air data probe operating and monitoring system is provided. The system includes at least one heating element, a power source, at least one current sensor, at least one clock, at least one memory, at least one controller and at least one output. The at least one heating element is housed within the air data probe. The power source is coupled to the at least one heating element. The at least one current sensor is coupled to sense a current draw through the at least one heating element. The at least one memory is used to store at least operating instructions and sensor data from the at least one current sensor. The at least one controller is coupled to control the power source to provide select drive voltages for the at least one heating element based on a current operating condition of the air data probe. The at least one controller is in communication with the at least one current sensor. The at least one controller is configured to implement the operating instructions in the at least one memory to track time that the at least one heating element of the air data probe has a temperature within defined temperature ranges using the at least one clock. The at least one controller is further configured to apply a cumulated weighted function that predicts the life expectancy of the air data probe based on an accumulated time the heating element is tracked within each temperature range. The output is in communication with the at least one controller. The at least one controller is configured to communicate a replace air data probe message to the output when a result of the cumulated weighted system reaches a select threshold.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a system and method of predicting when to replace an air data probe. For an airline operator a high reliability outcome can be achieved if failures are predicted with sufficient forewarning to ensure that the probes are replaced during a scheduled maintenance event. Operationally, a high reliability outcome can be achieved if unscheduled maintenance can be avoided.

Embodiments provide an air data probe that can accurately track and predict its health state so that remaining utility/lifetime can be determined so the air data probe can be replaced during a scheduled maintenance event.

The vast majority of air data probe failures are due to heater cable (heater element) failures. These type of failures tend to occur abruptly with little or no advanced notice. Investigations have shown that a simple current monitoring approach is not sufficient to track the onset of degradation and therefore is not a reliable approach to use in predicting the end of life of air data probes.

Figure 1:
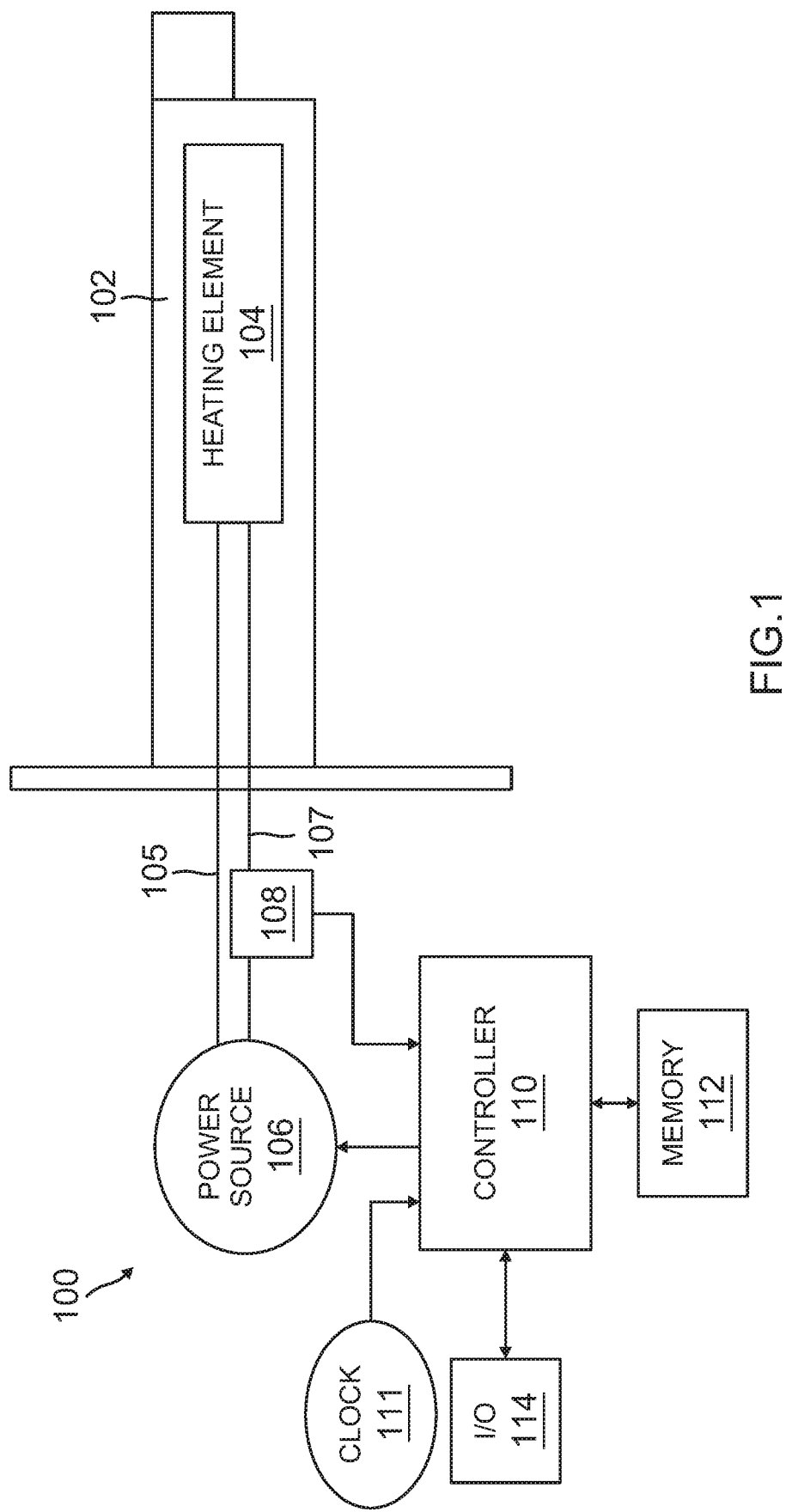
FIG. 1 illustrates a block diagram of an air data probe operating and monitoring system according to one example embodiment.

FIG. 1 illustrates an air data probe operating and monitoring system 100 of one example embodiment. The system 100 includes an air data probe 102. Within the air data probe is a heating element 104. Although only one heating element 104 is illustrated, an air data probe 102 may have more than one heating element. Hence, embodiments are not limited to one heating element 104. The heating element 104 is conductively coupled to a power source 106 via conductive lines 105 and 107 in this example. Further in this example, a current meter 108 (i.e. current sensor) is positioned within conductive line 107 to measure current flowing through the heating element 104.

A controller 110 is coupled to control operations of the power source 106. In particular, the controller 110 controls the drive voltage of power source 106. The control of the drive voltage applied to the heating element 104 is based at least in part on current operating parameters of the aircraft and conditions the air data probe 102 are experiencing. The controller 106 is further in communication with an output of the current sensor 108. In general, the controller 110 (processor) may include any one or more of a microprocessor, a digital signal processor (DSP), an application specific integrated circuit (ASIC), a field program gate array (FPGA), or equivalent discrete or integrated logic circuitry. In some example embodiments, controller 110 may include multiple components, such as any combination of one or more microprocessors, one or more controllers, one or more DSPs, one or more ASICs, one or more FPGAs, as well as other discrete or integrated logic circuitry. The functions attributed to controller 110 herein may be embodied as software, firmware, hardware or any combination thereof. Memory 112, which is also in communication with the controller 110, may include computer-readable instructions that, when executed by controller 110 provide functions of the controller 110. Such functions may include the functions relating to the prediction of when to replace the air data probe 102. The computer readable instructions may be encoded within the memory 112. Memory 112 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Further in communication with the controller 110 is an input/output 114. In embodiments, the controller 110 outputs information relating to the life expectancy of the air data probe 102 to the input/output 114 and receives information regarding temperature ranges and associated life expectancy values as discussed below in detail. A clock 111 is used by the controller 110 to track time the heating element 104 is activated as discussed below.

Tests conducted have found that the life times of electrical heaters are strongly dependent on the applied current or voltage and consequentially the temperature that the filament reaches during operation. A power law relationships can be used to predict the decrease in lifetime that occur when the applied voltage or current is increased. The heater cable (heater element) lifetimes are also strongly dependent on the operational conditions that they experience. A first order model of the lifetimes for the heater cables follow a power law relationship, as provided below, that is dependent on operational temperature, where the value for n can be found empirically through testing.

$$\frac{Life'}{Life} = \left(\frac{Temp}{Temp'}\right)^n$$

The exact relationship between lifetime, operational temperature and time may be different than the equation provided above. However, from this equation it is realized that both time and temperature are the important life limiting drivers. Since not all aircraft are operated in a similar manner e.g. short versus long haul, their air data probes will not see the same operational conditions. Thus strictly counting flight hours or even cycles is not as effective as finding the cumulative duration that the probe spends at various temperatures.

Figure 2:
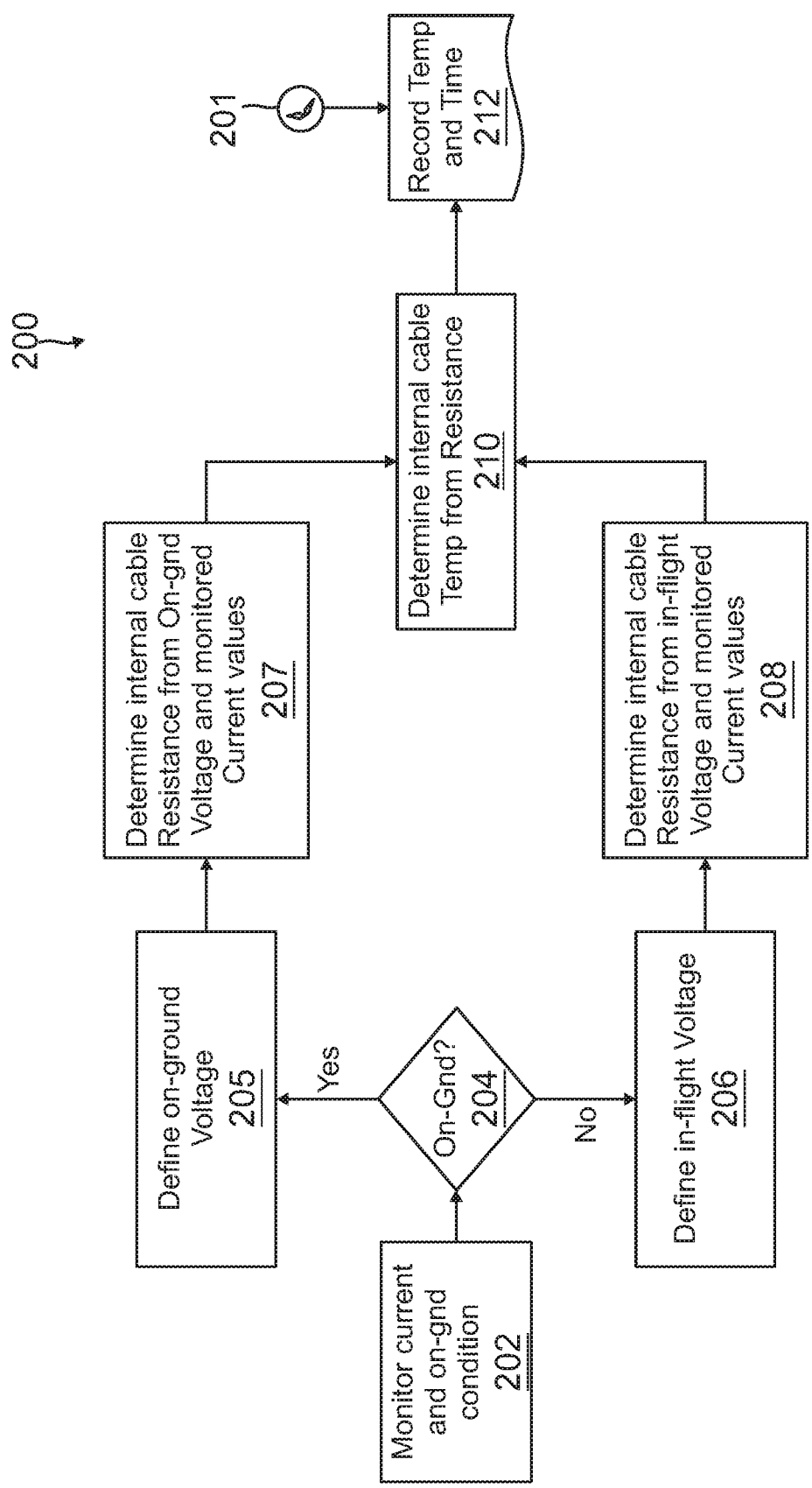
FIG. 2 illustrates a temperature monitoring flow diagram for an air data probe according to one example embodiment.

The operational temperature can be determined through commonly monitored conditions without the need to further instrument the probe in some embodiments. For example, some air data probes are made with a heating element that use a positive temperature coefficient (PTC) metal i.e. Balco, with a tightly controlled length and resistance value. Because the resistance of the heater cable (heating element) changes with temperature due to the PTC material, a functional relationship or table/mapping can be established between the heater cable resistance and the total cable temperature. The resistance of the cable can be determined from the current drawn for a given drive voltage according to the formula resistance (R)=current (C)/voltage (V). The drive voltages are generally known on board the aircraft and may change when the aircraft is on the ground versus in flight. The current drawn by the probes are also often monitored. For example, FIG. 2 illustrates a temperature monitoring flow diagram 200 for monitoring cable temperature over time for an air data probe of an example embodiment. The temperature flow diagram 200 illustrates that the air data probe is operated at different temperatures during different operations of the aircraft. The data collected may be used for calculating hours of operation and/or number of cycles but more importantly it may be used to determine the cumulative 'thermal fatigue' experienced by the probes based on the individual operational experience as described below.

In this prior art example, the current and on-ground condition is monitored at block (202). If it is determined at block (204) that the aircraft is on the ground a defined on-ground voltage is provided by the power source at step (205). The internal cable resistance is determined from on-ground voltage and monitored current values at block (207). The internal cable temperature is determined from the resistance and block (210). If it is determined that the aircraft is not on ground at block (204), an in-flight voltage is defined at block (206). The internal cable resistance is then determined from in-flight voltage and monitored current values at block (208). The internal cable temperature is determined from the resistance at block (210). Once an internal temperature is determined at block (210), the temperature and time it was determined, (with clock 201) is recorded at block (212).

Since the air data probe 102 is not constantly operating at a single temperature there needs to be a way to accumulate the thermal stress experienced by the probe heater over time. In some embodiments, a modified Miner's rule is used to accumulate the thermal stress experienced over time. The Miner's rule is commonly used for calculating the remaining life of a structural component that is undergoing cyclical stress. Embodiments consider thermally induced fatigue experienced by the probe as analogous to cyclical fatigue stress. Use of the Miner's rule also known as the Palmgren-Miner linear damage hypothesis, provides a method for combining different operational exposures along with the time of exposure to determine the cumulative life consumed by the probe while in operation. The rule is as follows:

$$C = \sum_{i=1}^{n} di/Di$$

Where C is the fraction life consumed. When C=1 the probe life has been expended. Di is the length of time that the probe can survive under a given temperature condition, i. And di is the accumulated length of time that the probe has experience under that temperature condition.

In implementing this approach embodiments break the continuous range of temperatures (current drawn) into discrete segments related to current drawn. These segments may be defined with thresholds similar to how an air data heater controller (ADHC) determines if the probe is operational. For example, the data collected could be continuously updating a histogram of temperature versus time. This histogram may be implemented in software or a simple digital hardware design that accumulates counts (time) at given threshold values (temperature conditions). This data may be stored locally on a digital probe or collected, stored or broadcast by an air data module. Further in one example embodiment, the data is passed to an onboard maintenance computer for local storage or datalink transmission to a ground based recipient. The remaining life of the probe may be determined using the above equation with the histogram counts.

Figure 3:
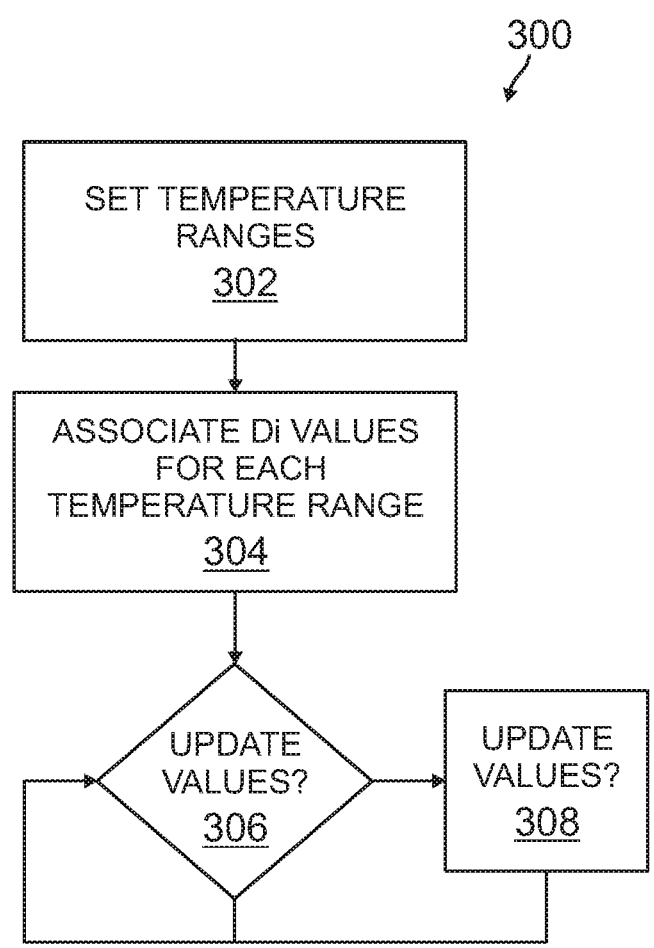
FIG. 3 illustrates a set up flow diagram for updating the prediction algorithm based on collected data according to one example embodiment.

A set up flow diagram 300 for updating the prediction algorithm based on collected data of an embodiment is illustrated in FIG. 3. The set up flow diagram 300 starts at step (302), setting temperatures ranges. At step (304), a period of time of life expectancy is assigned to each temperature range. In one embodiment the life expectancy value is Di as discussed above. In an embodiment, the period of time of life expectancy for each temperature range is stored in memory 112 via the I/O 114. Further in embodiments, the period of time of life expectancy (Di values) for each temperature range may be updated as information relating to period of time of life expectancy vs temperature range is gathered. Hence in this embodiment, when it is determined if that updated values are available at block step 306, update values can be used to improve the prediction of remaining life are provided at step 308.

Figure 4:
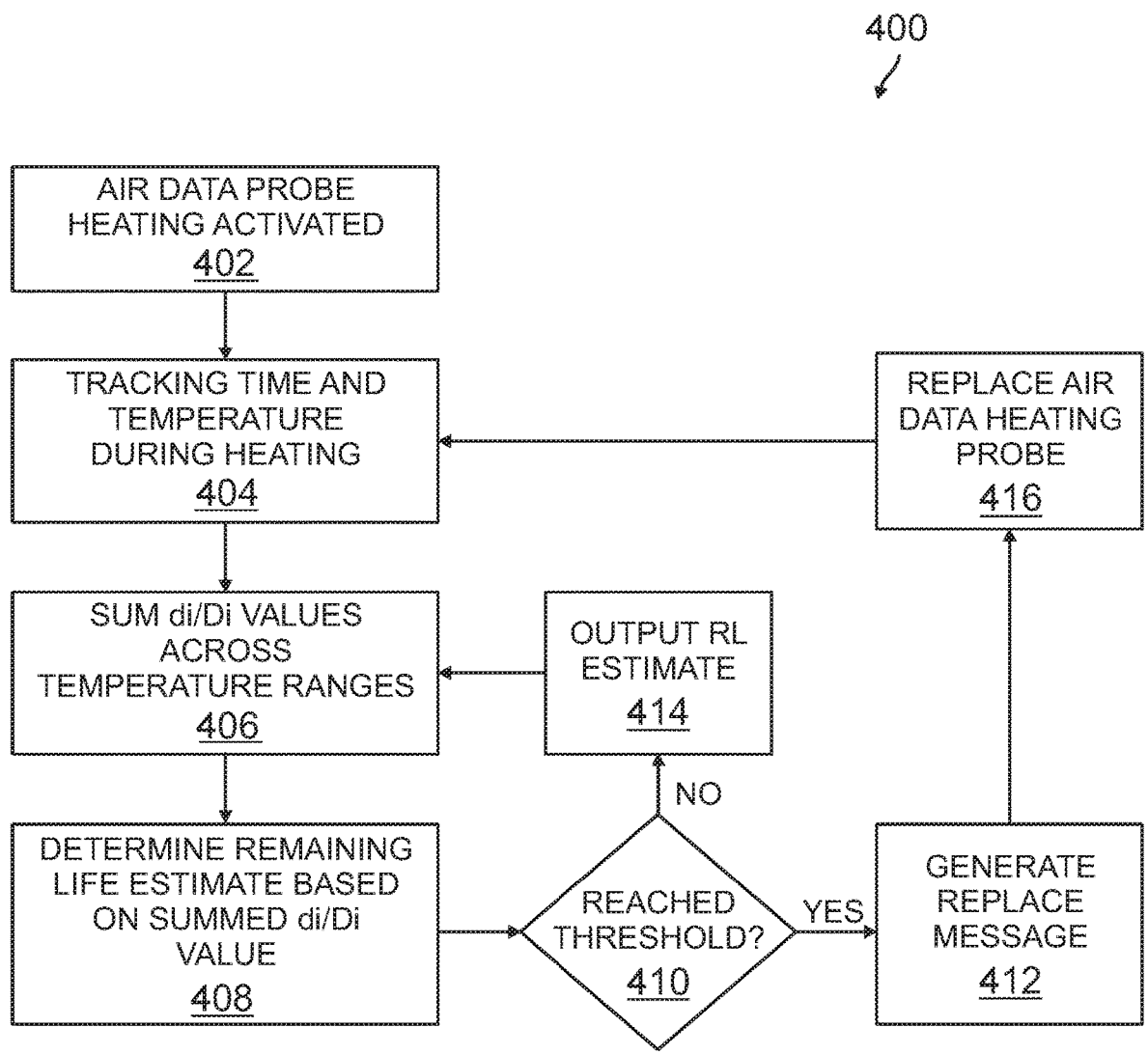
FIG. 4 illustrates an air data probe life expectancy flow diagram according to one example embodiment.

An air data probe life expectancy flow diagram 400 of an embodiment is illustrated in FIG. 4. The air data probe life expectancy flow diagram 400 is provided as a sequential series of steps. The sequence of steps may be different in other embodiments. Hence, embodiments are not limited by the sequence of steps set out in FIG. 4.

The air data probe life expectancy flow diagram 400 starts when an associated heating element 104 of an air data probe 102 is activated at step (402). During the heating of air data probe 102, the controller 110, with the use of clock 111 tracks the time and with the current sensor 108 tracks the temperature of the heating element 104.

At step (406), the controller 110, sums the di/Di values across temperature ranges as the heating element 104 of the air data probe 102 is being heated. The current determined remaining life estimate based on the di/Di is determined at step (408) via the controller 110. In an embodiment, it is then determined at step (410) if a defined threshold is reached by comparing a current result of C, the sum of di/Di components, to the defined threshold. If the threshold is reached at step (410), a replace message is generated at step (412) that is communicated to the I/O 114. If the threshold is not reached at step (410), in one embodiment, an estimate of remaining life estimate is output to the I/O 114 at step (414). The remaining life estimate is based off of the then current value of the di/Di in an embodiment. The process then continues at step (406) summing di/Di values as long as the heating element is activate. Further in one embodiment, the air data probe 102 is replaced at step (412) when a replace message generated at step (412) is received at the I/O 414. The process continues by monitoring the heating element of the new air data probe 102 at step (404) of the probe 102 when heating is activated.

In summary, airline operators are so averse to suffering an unscheduled repair of air data probes that they are removing the probes based on hours of operation well before their predicted end of life. With the implementation of the above described embodiments, a much more effective tool for predicting end of life based on the operational exposure of the air data probes via time and temperature history is provided. Moreover, embodiments provide a predictable maintenance, fewer grounded aircraft, predictable and lower probe spare inventory and longer use of existing probes that would otherwise have thousands of hours more useful life left when replaced based purely on hours of operation.

Example Embodiments

Example 1 is a method of determining when to replace an air data probe. The method includes measuring a temperature of a heating element of an air data probe; tracking an amount of time the heating element is within at least one temperature range; and providing an air data probe replacement indication when a replacement threshold is met that is at least in part based on reaching a cumulative amount of time the heating element has a measured temperature within the at least one temperature range.

Example 2, includes the method of Example 1, wherein measuring the temperature of the inner heating element further includes determining an operational resistance of the heating element by measuring the current drawn by the heating element for a given drive voltage; and deriving the temperature based on the determined resistance.

Example 3 includes the method of any of the Examples 1-2, wherein when more than one temperature range is used, the method further includes applying a cumulated weighted system that tracks the usage and predicts the life expectancy of the air data probe based on temperatures of the heating element over time within each temperature range.

Example 4 includes the method of any of the Examples 1-3, further includes adjusting the replacement threshold based at least in part on gathered data relating to the remaining life of the air data probe.

Example 5 includes the method of any of the Examples 1-4, further includes generating a remaining life estimate based at least in part on the measured temperature of the heating element and the tracked amount of time the heating element is within at least one temperature range.

Example 6 includes the method of any of the Examples 1-5, further includes setting temperature ranges; and associating a period of time of life expectancy with each temperature range.

Example 7 includes a method of determining when to replace an air data probe. The method includes measuring a temperature of at least one heating element of the air data probe; tracking time when the at least one heating element has a measured temperature within defined temperature ranges; applying a cumulated weighted system that predicts the life expectancy of the air data probe based on the tracked time of the at least one heating element within each temperature range; and generating a remaining life expectancy signal of the air data probe based on the prediction of the cumulated weighted system.

Example 8 includes the method of Example 7, further including setting the temperature ranges; and associating a period of time of life expectancy with each temperature range.

Example 9 includes the method of any of the Examples 7-8, wherein applying a cumulated weighted system further includes summing period of time of life expectancies over a length of time the at least one heating element can survive under a given temperature range across all temperature ranges.

Example 10 includes the method of any of the Examples 7-9, further including determining the temperature of the at least one heating element by measuring a current drawn by the heating element for a given drive voltage.

Example 11 includes the method of any of the Examples 7-10, further including providing an air data probe replacement indication when a replacement threshold is met that is at least in part based on reaching a cumulative amount of time the heating element has a measured temperature within the at least one temperature range.

Example 12 includes the method of any of the Examples 7-11, further including adjusting the replacement threshold based at least in part on gathered data relating to the remaining life of the air data probe.

Example 13 includes the method of any of the Examples 7-12, further including communicating the remaining life expectancy signal to at least one of an onboard maintenance computer and a remote central fleet maintenance tracking system.

Example 14 includes the method of any of the Examples 7-13, further including adjusting a drive voltage of a power source coupled to the at least one heating element based on a then current operating condition of the air data probe.

Example 15 is an air data probe operating and monitoring system. The system includes at least one heating element, a power source, at least one current sensor, at least one clock, at least one memory, at least one controller and at least one output. The at least one heating element is housed within the air data probe. The power source is coupled to the at least one heating element. The at least one current sensor is coupled to sense a current draw through the at least one heating element. The at least one memory is used to store at least operating instructions and sensor data from the at least one current sensor. The at least one controller is coupled to control the power source to provide select drive voltages for the at least one heating element based on a current operating condition of the air data probe. The at least one controller is in communication with the at least one current sensor. The at least one controller is configured to implement the operating instructions in the at least one memory to track time that the at least one heating element of the air data probe has a temperature within defined temperature ranges using the at least one clock. The at least one controller is further configured to apply a cumulated weighted function that predicts the life expectancy of the air data probe based on an accumulated time the heating element is tracked within each temperature range. The output is in communication with the at least one controller. The at least one controller is configured to communicate a replace air data probe message to the output when a result of the cumulated weighted system reaches a select threshold.

Example 16 includes the system of Example 15, wherein the at least one controller is further configured to determine the temperature of the at least one heating element by measuring a current drawn by the at least one heating element for a given drive voltage with the current sensor.

Example 17 includes the system of any of the Examples 15-16, wherein the at least one controller is further configured to sum a period of time of life expectancies over a length of time the at least one heating element can survive under a given temperature range across all temperature ranges in applying the cumulated weighted function.

Example 18 includes the system of any of the Examples 15-17, wherein the at least one controller is further configured to generate a remaining life expectancy signal that is communicated to the output.

Example 19 includes the system of any of the Examples 15-18, further including an input that is in communication with the at least one controller. The input is configured to communicate the temperature ranges and an association of period of time of life expectancies with each temperature range to the at least one controller for storage in the at least one memory.

Example 20 includes the system of any of the Examples 15-19, wherein the at least one controller is further configured to update the temperature ranges and associated period of time of life expectancies with each temperature range.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of determining when to replace an air data probe, the method comprising:
    setting at least one temperature range;
    measuring a temperature of a heating element of the air data probe;
    tracking an amount of time the heating element is within at least one temperature range; and
    providing an air data probe replacement indication when a replacement threshold is met that is at least in part based on reaching a cumulative amount of time the heating element has a measured temperature within the at least one temperature range; and
    associating a period of time of life expectancy for each temperature range of the at least one temperature range based on a power law relationship.

2. The method of claim 1, wherein measuring the temperature of the heating element further comprises:
    determining an operational resistance of the heating element by measuring the current drawn by the heating element for a given drive voltage; and deriving the temperature based on the determined resistance.

3. The method of claim 1, wherein when more than one temperature range is used, the method further comprises:
applying a cumulated weighted system that tracks the usage and predicts the life expectancy of the air data probe based on temperatures of the heating element over time within each temperature range.

4. The method of claim 1, further comprising:
adjusting the replacement threshold based at least in part on gathered data relating to a remaining life of the air data probe.

5. The method of claim 1, further comprising;
generating a remaining life estimate based at least in part on the measured temperature of the heating element and the tracked amount of time the heating element is within at least one temperature range.

6. A method of determining when to replace an air data probe, the method comprising:
measuring a temperature of at least one heating element of the air data probe;
tracking time when the at least one heating element has a measured temperature within defined temperature ranges;
applying a cumulated weighted system that predicts the life expectancy of the air data probe based on a power law relationship using the tracked time of the at least one heating element within each temperature range; and
generating a remaining life expectancy signal of the air data probe based on the prediction of the cumulated weighted system.

7. The method of claim 6, further comprising:
setting the temperature ranges; and
associating a period of time of life expectancy with each temperature range.

8. The method of claim 6, wherein applying the cumulated weighted system further comprises:
summing period of time of life expectancies over a length of time the at least one heating element can survive under a given temperature range across all temperature ranges.

9. The method of claim 6, further comprising:
determining the temperature of the at least one heating element by measuring a current drawn by the heating element for a given drive voltage, wherein the given drive voltage is one of an on ground voltage when it is determined an aircraft having the air data probe is on the ground and an in-flight voltage when it is determined the aircraft is not on the ground.

10. The method of claim 6, further comprising:
providing an air data probe replacement indication when a replacement threshold is met that is at least in part based on reaching a cumulative amount of time the heating element has a measured temperature within the at least one temperature range.

11. The method of claim 10, further comprising:
adjusting the replacement threshold based at least in part on gathered data relating to a remaining life of the air data probe.

12. The method of claim 6, further comprising:
communicating the remaining life expectancy signal to at least one of an onboard maintenance computer and a remote central fleet maintenance tracking system.

13. The method of claim 6, further comprising:
adjusting a drive voltage of a power source coupled to the at least one heating element based on a then current operating condition of the air data probe.

14. An air data probe operating and monitoring system, the system comprising:
at least one heating element housed within the air data probe;
a power source coupled to the at least one heating element;
at least one current sensor coupled to sense a current draw through the at least one heating element;
at least one clock;
at least one memory to store at least operating instructions and sensor data from the at least one current sensor;
at least one controller coupled to control the power source to provide select drive voltages for the at least one heating element based on a current operating condition of the air data probe, the at least one controller in communication with the at least one current sensor, the at least one controller further configured to implement the operating instructions in the at least one memory to track time that the at least one heating element of the air data probe has a temperature within defined temperature ranges using the at least one clock, the at least one controller further configured to apply a cumulated weighted function that predicts the life expectancy of the air data probe based on a power law relationship using an accumulated time the heating element is tracked within each temperature range; and
an output in communication with the at least one controller, the at least one controller configured to communicate a replace air data probe message to the output when a result of the cumulated weighted system reaches a select threshold.

15. The system of claim 14, wherein the at least one controller is further configured to determine the temperature of the at least one heating element by measuring a current drawn by the at least one heating element for a given drive voltage with the current sensor.

16. The system of claim 14, wherein the at least one controller is further configured to sum a period of time of life expectancies over a length of time the at least one heating element can survive under a given temperature range across all temperature ranges in applying the cumulated weighted function.

17. The system of claim 14, wherein the at least one controller is further configured to generate a remaining life expectancy signal that is communicated to the output.

18. The system of claim 14, further comprising:
an input in communication with the at least one controller, the input configured to communicate the temperature ranges and an association of period of time of life expectancies with each temperature range to the at least one controller for storage in the at least one memory.

19. The system of claim 14, wherein the at least one controller is further configured to update the temperature ranges and associated period of time of life expectancies with each temperature range.

* * * * *